United States Patent [19]
Gordon

[11] Patent Number: 5,222,589
[45] Date of Patent: Jun. 29, 1993

[54] CONVEYOR BELT CLEANERS

[75] Inventor: James R. Gordon, Benton, Ill.

[73] Assignee: Gordon Belt Scrapers, Inc., Benton, Ill.

[21] Appl. No.: 929,423

[22] Filed: Aug. 14, 1992

Related U.S. Application Data

[63] Continuation-in-part of Ser. No. 647,149, Jan. 29, 1991, abandoned.

[51] Int. Cl.⁵ .............................................. B65G 45/12
[52] U.S. Cl. ..................................... 198/497; 198/499
[58] Field of Search .................................. 198/497, 499

[56] References Cited

U.S. PATENT DOCUMENTS

| | | |
|---|---|---|
| 3,811,557 | 5/1974 | Hartwig. |
| 3,913,728 | 10/1975 | Pott. |
| 3,998,322 | 12/1976 | McBride. |
| 4,131,194 | 12/1978 | Andersson ........................ 198/497 |
| 4,202,437 | 5/1980 | Gordon. |
| 4,257,517 | 3/1981 | MacPherson et al.. |
| 4,269,301 | 5/1981 | Gibbs .............................. 198/499 |
| 4,349,098 | 9/1982 | Veenhof. |
| 4,489,823 | 12/1984 | Gordon. |
| 4,533,036 | 8/1985 | Gordon ............................ 198/499 |
| 4,598,823 | 7/1986 | Swinderman ..................... 198/497 |
| 4,643,293 | 2/1987 | Swinderman. |
| 4,658,949 | 4/1981 | Reicks ............................. 198/497 |
| 4,787,500 | 11/1988 | Holz ............................... 198/497 |
| 4,825,996 | 5/1989 | Davidts ........................... 198/497 |
| 4,838,409 | 6/1989 | Rappen ........................... 198/497 |
| 4,854,443 | 8/1989 | Gordon ........................... 198/497 |
| 4,917,231 | 4/1991 | Swinderman .................... 198/497 |
| 4,953,689 | 9/1990 | Peterson et al. ................. 198/497 |
| 4,962,845 | 10/1990 | Gibbs .............................. 198/499 |
| 5,016,746 | 5/1991 | Gibbs ........................... 198/497 X |

FOREIGN PATENT DOCUMENTS

| | | | |
|---|---|---|---|
| 0328171 | 8/1989 | European Pat. Off. ............ 198/499 |
| 1342834 | 10/1987 | U.S.S.R. ............................... 198/497 |
| 4515061 | 6/1978 | United Kingdom ................ 198/497 |
| 2012234 | 7/1989 | United Kingdom ................ 198/497 |
| 2221440 | 2/1990 | United Kingdom ................ 198/497 |

Primary Examiner—Robert P. Olszewski
Assistant Examiner—James R. Bidwell
Attorney, Agent, or Firm—Kinzer, Plyer, Dorn, McEachran & Jambor

[57] ABSTRACT

A primary conveyor belt cleaner includes an elongated support extending across but spaced from a conveyor belt of width W and includes a stiff guide extending for approximately the full length of the support; a scraper blade of resilient elastomer resin is mounted on the support and engages the conveyor belt surface. The scraper blade has a short base wall removably mounted on the support by a reinforcement that interfits with the guide; the blade has two longer curved side walls, an inner wall concave toward the belt and an outer wall convex away from the belt. The two side walls come together to form a scraping edge. The belt cleaner includes a torsion bias mechanism that resiliently maintains the belt scraping edge in continuous engagement with the belt. Two or more primary cleaners may be incorporated in one system. Flexure of the blade permits passage of a mechanical splice in the belt without appreciable damage to the blade or the splice.

17 Claims, 3 Drawing Sheets

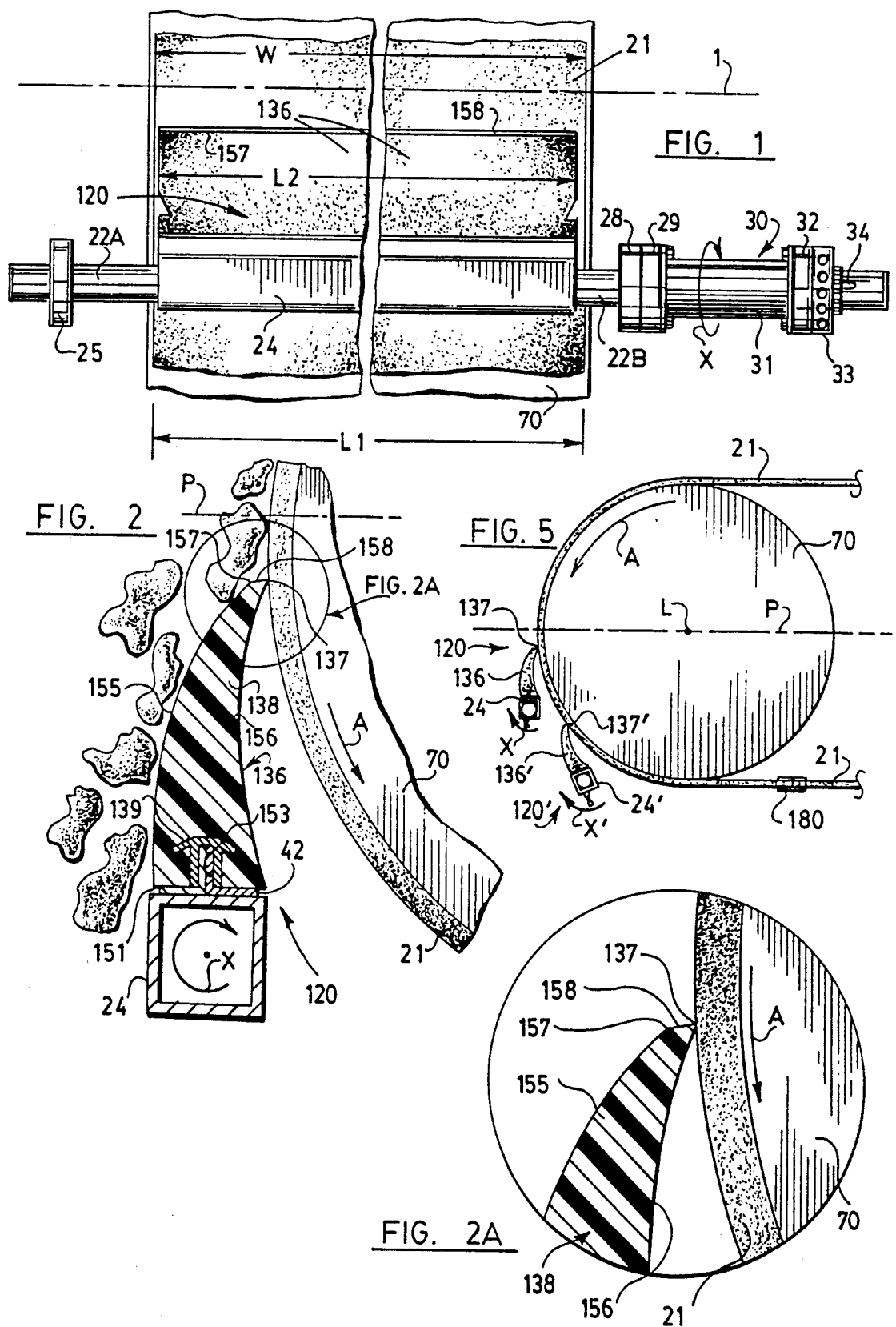

CONVEYOR BELT CLEANERS

RELATED APPLICATIONS

This is a continuation-in-part of U.S. Pat. application Ser. No. 07/647,149, filed Jan. 29, 1991, now abandoned.

BACKGROUND OF THE INVENTION

Single-blade and multi-blade belt scrapers or cleaners are frequently used with belt conveyors in mining and mineral storage operations and in a wide variety of other applications. Single-blade cleaners (the blade may be formed of a plurality of abutting segments) are usually used in primary cleaners, scraping conveyed material from a part of the conveyor belt backed up by the head pulley. These conveyor belt cleaners usually operate in an environment that can only be described as hostile. The working conditions are frequently wet, dirty, and even corrosive. Continuing maintenance activity is a necessity due to inevitable wear on the cleaner blades, but is often rendered difficult by limited access space and the aforementioned adverse working conditions. In excessively wet or corrosive environments, maintenance is made more difficult by corrosion of metal mounting bolts, clamps, and the like. All of these difficulties are likely to be present in mining operations and also in industrial applications.

In a primary belt cleaner the scraper blade must accommodate mechanical belt joints and heavy, clinging, localized accumulations. The primary cleaner blade should afford an effective, consistent scraping action despite extensive wear and continuing movement of belt joints (splices) through the cleaner. Corrosion should be precluded, along with effective shock protection for individual blades. Moreover, overly compliant or excessively stiff blades should be avoided to preclude excessive vibration.

SUMMARY OF THE INVENTION

It is an object of the invention, therefore, to provide new and improved constructions for primary conveyor belt cleaners, and for cleaner blades usable in either primary or secondary belt cleaners, that effectively eliminate or minimize the problems discussed briefly above while providing for extended operating life in a belt cleaner of minimum cost.

Another object of the invention is to provide a new and improved primary belt cleaner blade construction that permits use of two primary cleaners on one head pulley for improved cleaning in applications in which the conveyed material adheres to the conveyor belt.

In one aspect, the invention relates to a primary conveyor belt cleaner for cleaning the outer surface of a conveyor belt traversing a head pulley. The belt cleaner comprises an elongated support extending transversely of a conveyor belt of given width W, in spaced relation to a belt surface to be cleaned, the support having a length L1; a stiff guide of predetermined cross-sectional configuration on the support member extends for approximately the full length of the support member. A scraper blade, having a length L2, is mounted on the support and is engageable with the conveyor belt surface to be cleaned, the blade having a short base wall, incorporating a first elongated, stiff reinforcement, and two longer curved side walls, both curved in the same direction, extending away from the base wall and converging at a belt scraping edge, with $L2 \approx L1 \approx W$. One blade side wall, facing the belt conveyor and head pulley, is concave toward the belt conveyor and head pulley; the other blade side wall, facing away from the belt conveyor and head pulley, is convex away from the belt conveyor and head pulley. The scraper blade is removably mounted in the belt cleaner with the belt scraping edge of the blade engaging the belt conveyor surface to be cleaned and the blade base wall engaging and supported by the support member, the guide constituting a second stiff reinforcement interfitting with the first stiff reinforcement in the base wall of the blade. The torsion bias means resiliently urge the support toward rotation in a direction to maintain the belt scraping edge of the blade in continuous engagement with the conveyor belt surface to be cleaned. Flexure of the scraper blade, adjacent the belt scraping edge, permits a mechanical splice in the conveyor belt to pass through the belt cleaner with no appreciable damage to the splice, the belt, or the blade.

In another aspect the invention relates to a primary conveyor belt cleaner system for cleaning the outer surface of a conveyor belt traversing a head pulley having a given axis, the system including two primary belt cleaners disposed sequentially peripherally around the head pulley, below the head pulley axis. Each primary belt cleaner comprises an elongated support extending transversely of a conveyor a belt of given width W, in spaced relation to belt surface to be cleaned, the support having a length L1; a stiff guide of predetermined cross-sectional configuration, on the support, extends for approximately the full length of the support member. In each belt cleaner there is a scraper blade having a length L2, mounted on the support and engageable with the conveyor belt surface to be cleaned, the blade having a short base wall, incorporating a first elongated stiff reinforcement, and two longer side walls extending away from the base wall and converging at a belt scraping edge, with L2 L1 W. The blade is removably mounted in the belt cleaner with the belt scraping edge of the blade engaging the belt conveyor surface to be cleaned and the blade base wall engaging and supported by the support member; the guide includes a second stiff reinforcement interfitting with the first stiff reinforcement in the base wall of the blade. Each belt cleaner has torsion bias means resiliently urging the support toward rotation in a direction to maintain the belt scraping edge of the blade in continuous engagement with the conveyor belt surface to be cleaned. Flexure of the scraper blade, adjacent the belt scraping edge, permits a mechanical splice in the conveyor belt to pass through the belt cleaner with no appreciable damage to the splice, the belt, or the blade.

In a further aspect, the invention relates to a replacement blade unit for a primary conveyor belt cleaner of the kind comprising an elongated support extending transversely of a conveyor belt of given width W, in spaced relation to the belt surface to be cleaned, the support having a length L1, a guide of predetermined cross-sectional configuration on the support extending for approximately the full length of the support member, and a scraper blade having a length L2 mounted on the support and engageable with the conveyor belt surface to be cleaned, the scraper blade being removably mounted on the guide projecting into engagement with the belt conveyor surface to be cleaned, with $L1 \approx L2 \approx W$. The replacement blade unit comprises a flexible blade of molded, resilient elastomeric resin having a short base wall incorporating an elongated stiff reinforcement and having two longer curved side walls, both curved in the same direction, extending away from the opposite sides of the base wall and converging at an elongated belt scraping edge. The blade reinforcement and guide dimensions are such that with the blade unit in place on the guide the base wall of the blade unit engages and is supported on the support member. One blade side wall, facing the belt conveyor and head pulley, is concave toward the belt conveyor and head pulley; the other blade side wall is convex away from the belt conveyor and head pulley. When the blade unit is mounted in a belt cleaner, flexure of the scraper blade, adjacent the belt scraping edge, permits a mechanical splice in the conveyor belt to pass through the belt cleaner with no appreciable damage to the splice, the belt, or the blade.

In yet another aspect the invention relates to a blade unit for a conveyor belt cleaner comprising a flexible blade of molded, resilient, elastomer resin having a short base wall incorporating a stiff, elongated reinforcement, with two longer curved side walls, constituting a convex outer blade wall and a concave inner blade wall, extending away from the base wall; the outer blade wall further includes a short outer transition wall surface at the edge of the outer blade wall opposite the base wall, and at an oblique angle to the convex curve of the outer blade wall, the outer transition wall surface converging with the concave inner blade wall at an elongated belt scraping edge. A stiff mounting member is molded integrally into the blade to afford a stiff reinforcement longitudinally of the base wall of the blade. When the blade unit is mounted in a belt cleaner, flexure of the scraper blade, adjacent the belt scraping edge, permits a mechanical splice in the conveyor belt to pass through the belt cleaner with no appreciable damage to the splice, the belt, or the blade.

BRIEF DESCRIPTION OF THE DRAWINGS

FIG. 1 is a front elevation view of a primary conveyor belt cleaner constructed in accordance with one embodiment of the invention;

FIG. 2 is a side elevation view, partly in cross section, taken approximately as indicated by line 2—2 in FIG. 1;

FIGS. 2A is an enlarged view of the encircled portion of FIG. 2;

FIG. 5 is a partly schematic side elevation view of a dual primary conveyor belt cleaner system constructed in accordance with another embodiment of this invention.

DESCRIPTION OF THE PREFERRED EMBODIMENTS

Figure 3A:
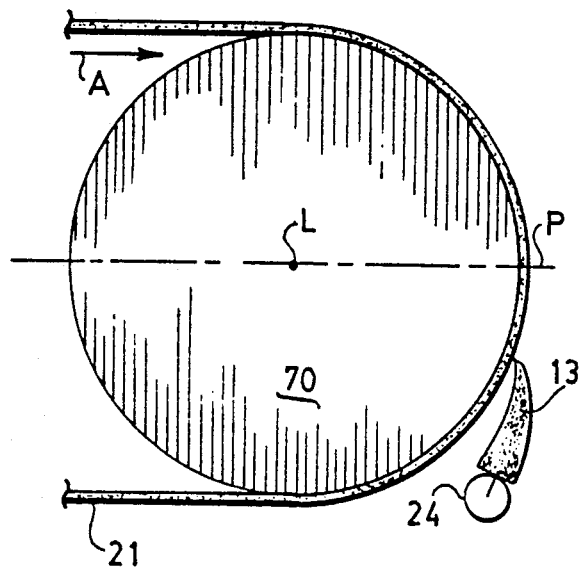
FIGS. 3A-3D illustrate, schematically, successive stages of wear for the blade of the primary cleaner of FIG. 1.

FIGS. 1, 2, and 2A illustrate a primary conveyor belt cleaner 120 for cleaning a conveyor belt 21 of width W. Belt 21 is driven in the direction of arrow A, FIGS. 1 and 2, around the longitudinal axis L, FIG. 1, on the surface of a head pulley 70.

Belt cleaner 120 comprises two shafts 22A and 22B that are aligned with each other and that are joined by an elongated support 24. Support 24 preferably comprises a rigid metal sleeve that extends transversely of belt 21 in spaced relation to the outer surface to be cleaned. Support 24 has a length L1 approximately equal to the belt width W; they are shown equal in FIG. 1. The left-hand end of shaft 22A, FIG. 1, is journalled in a bearing 25 supported by a fixed frame (not shown). Inwardly from bearing 25, shaft 22A is affixed to the elongated sleeve or support 24 by suitable means (not shown). If desired, the shaft segments 22A, 22B may be a continuous shaft through the interior of support sleeve 24.

The right-hand portion of shaft 22B, FIG. 1, extends through another bearing 28 mounted in the fixed frame (not shown) that affords general support for primary conveyor cleaner 120. Bearing 28 is connected to a flange 29 on a torsion tube 31 that is part of a torsion bias mechanism 30. Another flange 32 on the other end of torsion tube 31 is connected to a collar 33. Collar 33 is connectable to the outer end of shaft 22A through an angularly adjustable connection comprising a shear pin 34.

As shown in FIG. 2, there is an inverted T-shaped mounting member or guide 42, shown as formed by two angle irons, affixed to support sleeve 24. Mounting member 42 preferably extends for the full length of sleeve 24. Guide 42 is also a blade reinforcement, as described hereinafter. Guide 42 may be welded or otherwise firmly secured to transverse support 24. Moreover, guide 42 may be continuous or intermittent along sleeve 24, depending on the blade construction employed.

In primary belt cleaner 120, a single, unitary scraper or cleaner blade 136 is mounted directly on support 24. As shown in FIG. 1, blade 136 may have a length approximately equal to the length L1 of support member 24 and the width W of belt 21. Alternatively, a plurality of blade segments may be utilized, abutting each other, with the same overall length.

Scraper blade 136 has a short base wall 151 and two substantially longer side walls 155 and 156; see FIG. 2. Thus, blade 136 is generally triangular in cross-sectional configuration. Walls 155 and 156, however, are curved, in the same direction, and blade 136 is mounted on support 24 so that the one side wall 156 of the blade that faces belt 21 and head pulley 70 is concave toward the belt and pulley. With that alignment the other wall 155 of blade 136 is concave outwardly of pulley 70 and belt 21. In the preferred construction for primary blade 136, the outer (concave) wall 155 of blade 136 projects inwardly toward wall 156 from a break line 157 (FIGS. 2 and 2A).

Break line 157 is preferably somewhat rounded, affording a smooth corner which joins the convex wall 155 to a second, short transition wall surface 158 that extends to the upper edge of the concave wall 156. The intersection of transition surface 158 of wall 155 with the inner concave wall 156 defines the scraping edge 137 of blade 136. That is, surface 158 affords a truncated or curtailed transition of wall 155 to wall 156 in blade 136. With this blade configuration, the outer end or tip portion 138 of blade 136 is thicker than would have been the case if the wall 155 did not have the break line 157 ending in the inwardly directed transition surface 158. As explained below, the tip portion 138 in a new, unworn scraper blade provides a significant improvement during inception of blade operation, particularly during movement of a mechanical belt splice past cleaner 120.

Primary blade 136 has a rigid metal reinforcement 139 molded into the base wall 151 of the blade. Reinforcement 139 is of inverted U-shaped configuration, affording a receptacle 15 facing outwardly of the base wall 151 of the blade. Receptacle 153 receives the upwardly projecting portion of guide 42, so that the guide serves as a reinforcement for the base portion of blade 136 in addition to providing a guide to align the blade on support 24. Inasmuch as primary cleaner 120 works on the surface of belt 21 in that part of the belt that is in contact with head pulley 70, there is no need to provide for varying angular configurations other than an incremental and instantaneous adjustment in angular position of the blade which is absorbed by the torsion bias mechanism 30, as explained below. On the other hand, support 24 is provided with a torsion bias device such as the device 30, FIG. 1, to bias support member 24 in the direction of the arrow X, FIGS. 1 and 2.

The wear pattern for blade 136 of primary belt cleaner 120 is illustrated in sequential views in FIGS. 3A-3D. FIG. 3A shows blade 136 at a position 136A approximately corresponding to that illustrated in FIG. 2. To indicate relative disposition of blade 136, a plane P is shown in FIGS. 2, 3A, 3B and 5 and is defined as a horizontal plane which includes the longitudinal axis L of head pulley 70. Blade 136 is shown well below plane P in FIGS. 3A-3D, for purposes of illustration.

Figure 3B:
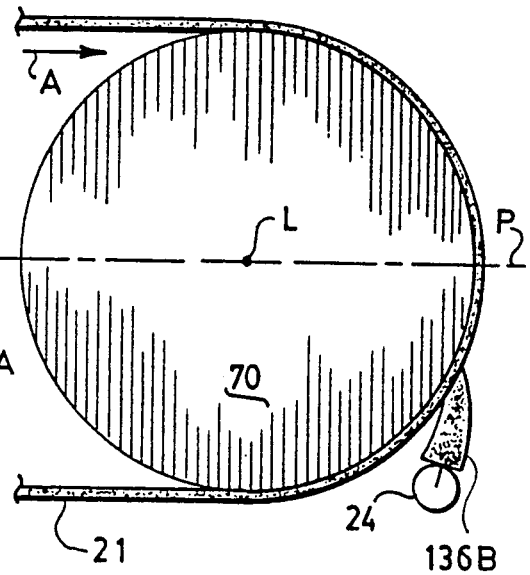
Figure 3C:
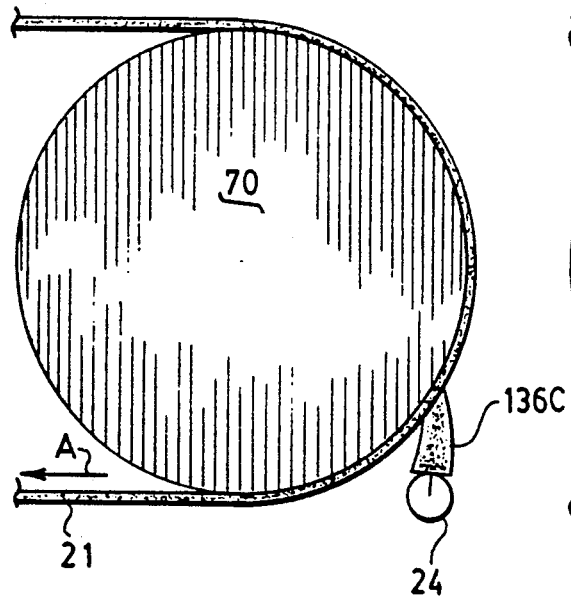
Figure 3D:
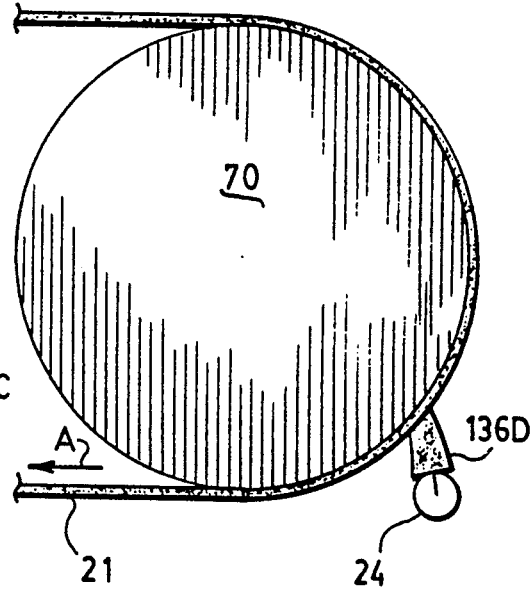

At the outset, as in FIG. 3A, there is little or no wear on the scraper blade; blade 136A is assumed to be new. FIGS. 3B, 3C, and 3D show successive stages in the wear life of the primary cleaner blade, with additional increments of wear of the blade illustrated by the blades 136B, 136C, and 136D. As shown in FIG. 3D, blade 136D is worn to the point at which it requires replacement. These figures also illustrate the substantial changes in angular alignment between the blade and the belt 21 on the surface of head pulley 70.

In all embodiments of the present invention, the shape of the scraper blade, with elongated curved walls tapering toward each other from a short base wall, allows for longer wear than with previously known constructions. With increasing wear, there is less tendency for the blade to bend or "give" in response to minor disturbances, a characteristic of this construction that increases blade longevity. On the other hand, the blade shape allows for the use of appreciably "softer" and more resilient blade materials than with previously known curved blades. As a consequence, belt cleaners using the blade shape of the present invention can accommodate mechanical belt splices and other like belt obstructions better than heretofore known belt cleaners, and last longer in many applications. Moreover, the shape of blade 136 permits use of plural primary cleaners in a single system as discussed in connection with FIG. 5.

Thus, the shape of blade 136, with its converging curved walls 155 and 156 and the thickened tip portion 138 in an unworn blade, provides a resilient spring back feature when the blade end section 138 and scraping edge 137 undergo stresses which arise from debris adhered to the belt or from a mechanical belt joint. This feature continues to play a role in blade operation even after substantial blade wear, in part because a relatively soft, more resilient resin can be and is used in molding blade 136. This can be quite important for any belt 21 on which debris has adhered and which is especially difficult to scrape and for any belt 21 that employs mechanical splices.

FIGS. 4A-4D are similar to FIG. 2; they afford a cross-section view of belt 21, head pulley 70, and blade 136 as a mechanical joint 180 in belt 21 moves past the scraping edge 137 of blade 136. The belt splice 180 comprises an inner plate 182 and an outer plate 184 located on opposite sides of two segments 21X and 21Y of conveyor belt 21. The two segments 21X and 21Y of belt 21 are joined by the mechanical joint 180 to provide a part of the endless belt used in the conveyor. There may be several such mechanical joints 180 in belt 21; the number of splices depends to some extent on the length of the conveyor belt. Plates 182 and 184 are secured to each other by pins or rivets 186 between the plates; pins 186 also go through the ends of belt segments 21X and 21Y. Thus, plates 182 and 184 of mechanical joint 180 sandwich the two ends of the belt 21 between them to retain the belt ends together.

FIGS. 4A-4D show successive intervals of time which mechanical joint 180 passes the scraping edge 137 of a newly installed, unworn blade 136. Of course, the duration of those time intervals depends upon the speed of movement in the direction of arrow A and hence cannot be stated precisely. This particular example, that of a mechanical joint meeting the scraping edge of the resilient blade, is used because it occurs at least once and usually several times for each revolution of belt 21 around the conveyor. However, operating principles featured in the discussion of mechanical joint 180 are equally applicable in the case of adhered debris or any other anomaly which may occur in the smoothness or flatness of belt 21.

Figure 4A:
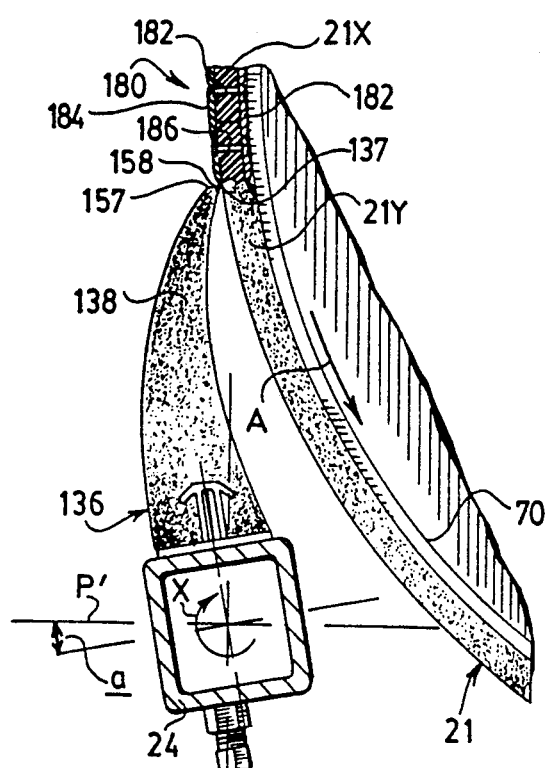
FIGS. 4A-4D illustrate, in a partial, cross-sectional view, successive positions of the belt cleaner blade and its scraping edge during passage of a mechanical belt joint or splice.
Figure 4B:
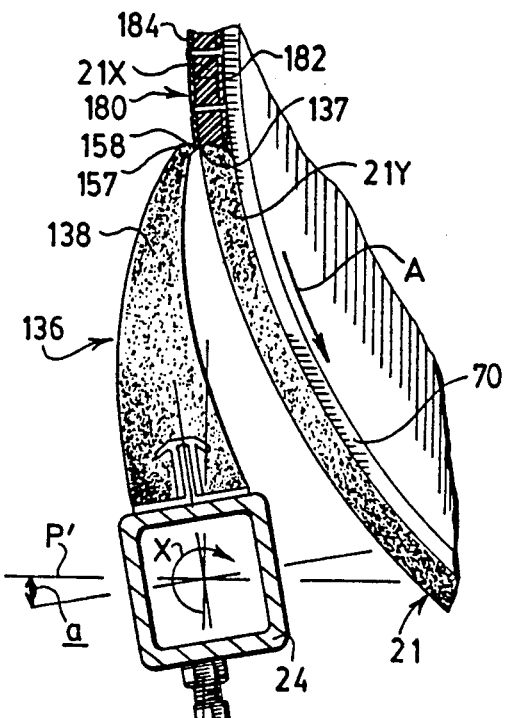
Figure 4C:
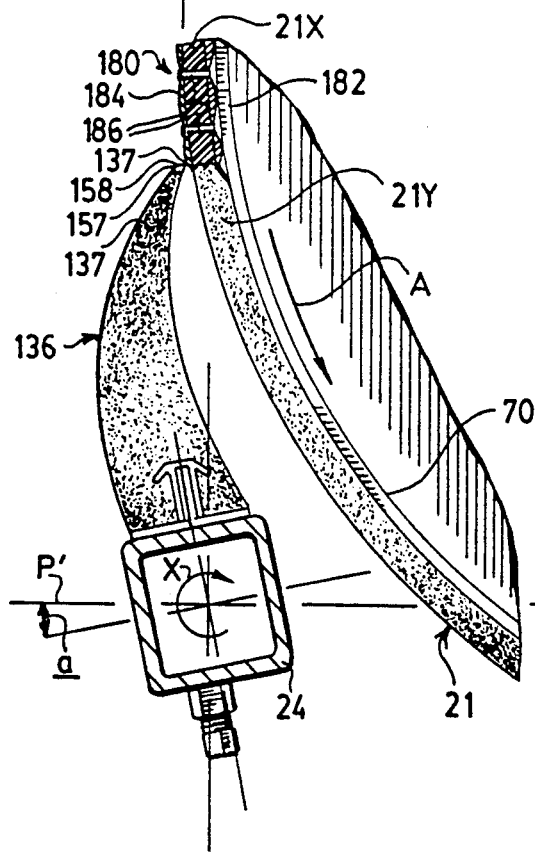
Figure 4D:
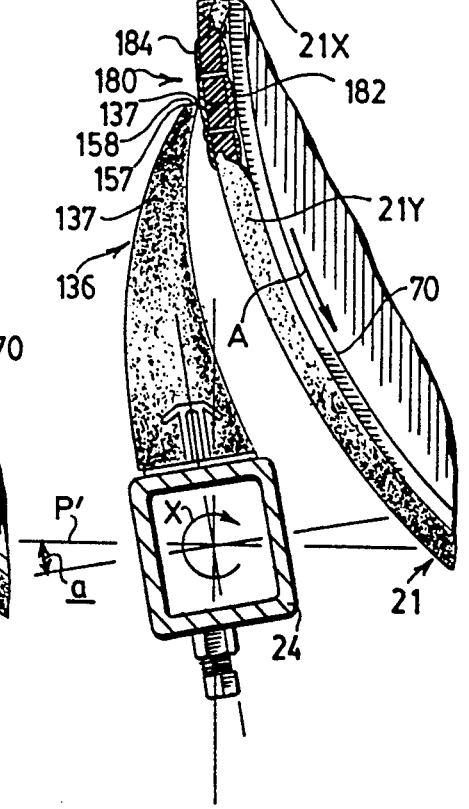

FIG. 4A shows the position of a new blade 136 and its scraping edge 137 as joint 180 first contacts the scraping edge 137 of the blade. The outer surface of belt 21 is displaced away from the outer surface of head pulley 70 to accommodate the increased thickness of belt 21 caused by splice 180. Because of the resilience of the blade material, scraping edge 137 and a local portion of the blade tip 138 are first bent toward the left, outwardly from the normal blade position, FIG. 2. At this point (FIG. 4A) the main body of the blade 136 has moved a short angular distance against the tension, in direction X, from the torsion bias mechanism 30 (FIG. 1). The angular displacement of the support 24 relative to a normal or index position, line P', is indicated as angle a in this and the succeeding views (FIGS. 4B-4D). Angle a indicates the difference in angular position of support 24 from that normal or index position, FIG. 2.

In FIG. 4A, angle a is approximately 10°. In a preferred actual installation, the scraping edge 137 would contact the head pulley 70 some small distance (e.g., two inches) below the plane P (FIGS. 2, 3A, 3B). Plane P' is parallel to plane P. Accordingly, the contact point of the scraping edge 137 and belt 21 on head pulley 70 occurs beyond the point where the belt 21 has begun to return toward the right in the direction of rotation A.

FIG. 4B illustrates the next instant of the belt cleaner operation; joint 180 has rotated to a point just a short distance lower than that shown in FIG. 4A. Because of the elasticity of the material of blade 136, and due to the shape and dimensions of blade 136, the scraping edge 137 of the blade maintains its position relative to the outer plate 184 of joint 180. As the outer plate 184 of joint 180 rotates with the head pulley in the direction A, the scraping edge 137 of blade 136 is compressed downwardly; the main body of blade 136 does not come under tension and is not thrust radially outwardly from its position relative to the surface the head pulley 70 to any appreciable extent. Rather, blade 136 bends slightly. Thus, in FIG. 4B the angle a changes only infinitesimally; it is approximately 10°1'.

FIG. 4C illustrates the instant when the resiliency of blade 136 causes its scraping edge 137 to be released by the edge of the upper joint plate 184 and to spring back to an extended position. The configuration of the main body of blade 136 is bent as it returns toward its normal, non-stressed configuration. At this point belt 21 is greater in thickness, at joint 180, due to the presence of plates 182 and 184. This greater thickness causes blade 136 to rotate somewhat farther against the angular force X applied by the torsion bias mechanism, in order to compensate for the difference in angular position. However, the main body of blade 136 has not yet experienced the effects of the outward motion of the blade end section 138. Thus, the base of the blade 136 maintains the "bowed out" position (FIG. 4B); angle a in FIG. 4C is approximately 11°8'.

FIG. 4D illustrates the relationship of the belt cleaner components as the mechanical position of the joint 180 continues its movement past the scraper blade edge 137. In this figure, blade 136, and especially the base, experiences the full effect of the sudden release of compressive tension which was caused by the downward displacement of the end section 138. Thus, the base of the blade 136 indicates only a slight angular displacement because the base of the blade is undergoing the overreaction of the resilient springing force of the blade with the release of tension compressive force on scraping edge 137, which is suddenly set free. Accordingly, although the end section 138 of blade 136 is angularly displaced more than normal, angle a is back to about 10°1', as in FIG. 4B. Once splice 180 clears scraping edge 137, blade 136 and support 24 return to their initial positions, FIG. 2.

FIGS. 4A-4D illustrate a significant feature and distinct advantage of the inventive blade. The combination of a relatively "soft" resilient material as the constituent material for blade 136 and the configuration and placement of blade 136 and its support mechanism, together with the continuous resilient bias X from mechanism 30, provide an ability to maintain the scraping edge 137 of the blade 136 flush against the surface of the belt 21 even when encountering anomalies, such as joint 180, in the belt surface. Moreover, the transition blade surface 158 is angled relative to walls 155 and 156 of blade 136 so that any material engaging surface 158 is deflected from blade 136. Thus the shape, dimensions and configuration of the blade, the support and the head pulley provide a most efficient scraping function for the cleaning system, and withstand mechanical splices and other anomalies without damage to the scraper blade.

FIG. 5 illustrates another embodiment of the cleaning system of this invention. The system shown in FIG. 5 includes a primary cleaner 120, as described above, with its support 24 biased in direction X, and blade 136 with its edge 137 engaging a conveyor belt 21 passing over a head pulley 70. There is no secondary cleaner of the conventional kind. Instead, the system of FIG. 5 comprises a second primary cleaner 120' having a blade 136' with its tip edge 137' engaging belt 21. The components 136', 137', and 24' of cleaner 120' may have the same length, shape and dimensions identical of the corresponding components of belt cleaner 120. Indeed, belt cleaner mechanism 120' is preferably a duplicate of cleaner 120.

The blade 136' of the second primary cleaner 120' is positioned further along the path of the belt 21, beyond blade 136 of cleaner 120, in the direction A of conveyor belt movement. For an unworn blade 136, the preferable distance from plane P down to the contact point of the blade scraping edge 137 with belt 21 is approximately two inches. The second scraper 120' may be mounted to contact belt 21 quite close to cleaner 120. For a blade height of six inches, therefore, the distance between plane P and the contact point of scraping edge 137' of the secondary cleaner blade 136' may be approximately eight inches. Of course, substantial variation is permissible, depending in part on the diameter of head pulley 70.

The close relative positions of blades 136 and 136' (FIG. 5) provides for a more efficient belt cleaning function than usual with a more conventional primary and secondary belt cleaner configuration. The uppermost blade 136 usually has an angle of incidence which approximates a vertical tangent to the cylindrical surface of the head pulley. Even after blade 136 has become worn to a degree where the transition surface 158 is no longer on the blade (see, for example, blade 136B, FIG. 3B), the angle between the head pulley 70 and the inner blade wall 155 remains an obtuse angle.

Moreover, the inwardly curved concave configuration of the outer blade wall 156, relative to the base wall 151, permits blade support 24 to be disposed close to the head pulley 70 without interfering with operation of the conveyor. This is advantageous because it enables the blade to maintain an obtuse angle between its outer wall 156 and the head pulley and belt surface even after considerable wear of the blade; see blades 136C and 136D in FIGS. 3C and 3D respectively.

Referring again to FIG. 5, because the blade 136' of the second primary cleaner 120' is disposed at a point further along the path of arrow A in which the belt 21 is driven, that blade 136' is disposed at an even greater angle to the vertical than is blade 136. Thus, if any debris continues adhere to belt 21 after it has passed blade 136, the secondary cleaner comprising blade 136' will be more apt to dislodge and remove the debris because of the added force resulting from gravitational pull at the point of engagement of edge 137' with the surface of belt 21. Blade 136', which cleans the outer surface of the belt across its whole width, provides an efficient second cleaning capacity for the system. In particularly adverse applications conveying material that adheres strongly to belt 21, a blade 136' may be used in conjunction with a secondary cleaning system of the kind described in application Ser. No. 07/877,229 filed May 1, 1992.

For blades 136, polyurethane is the preferred resin, though other resilient resins can be used. Polyurethane in a durometer range of 75 to 85 Shore A is preferred. For the rigid elements (support 24, guide 42, etc.), metal is preferred, though rigid resin or laminate members could be employed in some instances, as for reinforcements 42 and 139. In all of the embodiments described above, blade 136 is shown as one integral, continuous member having a length L1 approximately equal to belt width W. It should be understood, however, that the blade 136 may be assembled as a sequence of shorter blade segments, as shown in the applicant's earlier U.S. Pat. No. 4,533,036. Reference to a blade in the appended claims is intended to include such an assembly of shorter blade segments.

I claim:

1. A primary conveyor belt cleaner for cleaning the outer surface of a conveyor belt traversing a head pulley, comprising:

an elongated support extending transversely of a conveyor belt of given width W, in spaced relation to a belt surface to be cleaned, the support having a length L1;

a stiff guide of predetermined cross-sectional configuration on the support, the guide extending for approximately the full length of the support member;

a scraper blade having a length L2, mounted on the support and engageable with the conveyor belt surface to be cleaned, the blade having a short base wall, incorporating a first elongated, stiff reinforcement, and two longer curved side walls, both curved in the same direction, extending away from the base wall and converging at a belt scraping edge, with $L2 \approx L1 \approx W$;

one blade side wall, facing the belt conveyor and head pulley, being concave toward the belt conveyor and head pulley;

the other blade side wall, facing away from the belt conveyor and head pulley, being convex away from the belt conveyor and head pulley;

the scraper blade being removably mounted in the belt cleaner with the belt scraping edge of the blade engaging the belt conveyor surface to be cleaned and the blade base wall engaging and supported by the support member, the guide constituting a second stiff reinforcement interfitting with the first stiff reinforcement in the base wall of the blade;

and torsion bias means resiliently urging the support toward rotation in a direction to maintain the belt scraping edge of the blade in continuous engagement with the conveyor belt surface to be cleaned;

flexure of the scraper blade, adjacent the belt scraping edge, permitting a mechanical splice in the conveyor belt to pass through the belt cleaner with no appreciable damage to the splice, the belt, or the blade.

2. A primary belt conveyor cleaner according to claim 1 in which the other blade side wall, near its convergence with the one side wall, terminates in a short transition wall that extends to the one side wall to form the belt scraping edge.

3. A primary belt conveyor cleaner according to claim 2 in which the transition wall is flat.

4. A primary belt conveyor cleaner according to claim 1 in which the blade is of resilient molded polyurethane in a Shore A durometer range of 75 to 85.

5. A primary belt conveyor cleaner according to claim 4 in which the guide and the reinforcement are both formed of metal.

6. A primary belt conveyor cleaner according to claim 4 in which the guide projects outwardly of the support, the reinforcement is U-shaped in cross-section, and the guide is received within the reinforcement.

7. A primary belt conveyor cleaner according to claim 6 in which the reinforcement includes lateral projections to anchor it in the base wall of the blade, so that the reinforcement is pi-shaped in cross section.

8. A primary belt conveyor cleaner according to claim 7 in which the guide and the reinforcement are both formed of metal.

9. A primary conveyor belt cleaner system for cleaning the outer surface of a conveyor belt traversing a head pulley and having a given axis, including two primary belt cleaners disposed sequentially peripherally around the head pulley, below the head pulley axis, each primary belt cleaner comprising:

an elongated support extending transversely of a conveyor belt of given width W, in spaced relation to a belt surface to be cleaned, the support having a length L1;

a stiff guide of predetermined cross-sectional configuration on the support, the guide extending for approximately the full length of the support member;

a scraper blade having a length L2, mounted on the support and engageable with the conveyor belt surface to be cleaned, the blade having a short base wall, incorporating a first elongated stiff reinforcement, and two longer side walls extending away from the base wall and converging at a belt scraping edge, with $L2 \approx L1 \approx W$, one side wall being concave toward the head pulley and the other side wall being convex away from the head pulley;

the blade being removably mounted in the belt cleaner with the belt scraping edge of the blade engaging the belt conveyor surface to be cleaned and the blade base wall engaging and supported by the support member, the guide including a second stiff reinforcement interfitting with the first stiff reinforcement in the base wall of the blade;

and torsion bias means resiliently urging the support toward rotation in a direction to maintain the belt scraping edge of the blade in continuous engagement with the conveyor belt surface to be cleaned;

flexure of the scraper blade, adjacent the belt scraping edge, permitting a mechanical splice in the conveyor belt to pass through the belt cleaner with no appreciable damage to the splice, the belt, or the blade.

10. A primary conveyor belt cleaner system according to claim 9 in which, in each scraper blade, the other side wall, near its convergence with the one side wall, terminates in a short transition wall that extends to the one side wall to form the belt scraping edge.

11. A primary conveyor belt cleaner system according to claim 10 in which, in each scraper blade, the transition wall is flat.

12. A primary conveyor belt cleaner system according to claim 9 in which each scraper blade is of molded resilient polyurethane in a Shore A durometer range of 75 to 85.

13. A replacement blade unit for a primary conveyor belt cleaner of the kind comprising an elongated support extending transversely of a conveyor belt of given width W, in spaced relation to the belt surface to be cleaned, the support having a length L1, a guide of predetermined cross-sectional configuration on the support extending for approximately the full length of the support member, and a scraper blade having a length L2 mounted on the support and engageable with the conveyor belt surface to be cleaned, the scraper blade being removably mounted on the guide projecting into engagement with the belt conveyor surface to be cleaned, with $L1 \approx L2 \approx W$;

the replacement blade unit comprising:

a flexible blade of molded, resilient elastomeric resin having a short base wall incorporating an elongated stiff reinforcement and having two longer curved side walls, both curved in the same direction, extending away from the opposite sides of the base wall and converging at an elongated belt scraping edge;

the blade reinforcement and guide dimensions being such that with the blade unit in place on the guide the base wall of the blade unit engages and is supported on the support;

one blade side wall, facing the belt conveyor and head pulley, being concave toward the belt conveyor and head pulley;

the other blade side wall being convex away from the belt conveyor and head pulley;

flexure of the scraper blade, adjacent the belt scraping edge, when the blade unit is mounted in a belt cleaner, permitting a mechanical splice in the conveyor belt to pass through the belt cleaner with no appreciable damage to the splice, the belt, or the blade.

14. A replacement blade unit for primary belt conveyor cleaner according to claim 13 in which the blade reinforcement is formed of metal and is of inverted U-shaped configuration, facing downwardly from the base wall of the blade to receive a guide on the support member.

15. A replacement blade unit for primary belt conveyor cleaner according to claim 13 in which the blade is molded of resilient polyurethane in a Shore A durometer range of 75 to 85.

16. A blade nit for a conveyor belt cleaner comprising a flexible blade of molded, resilient, elastomer resin having a short base wall incorporating a stiff, elongated reinforcement, with two longer curved side walls, constituting a convex outer blade wall and a concave inner blade wall, extending away from the base wall;

the outer blade wall further including a short outer transition wall surface at the edge of the outer blade wall opposite the base wall, and at an oblique angle to the convex curve of the outer blade wall, the outer transition wall surface converging with the concave inner blade wall at an elongated belt scraping edge;

and a stiff mounting member, molded integrally into the blade to afford a stiff reinforcement longitudinally of the base wall of the blade;

flexure of the scraper blade, adjacent the belt scraping edge, when the blade unit is mounted in a belt cleaner, permitting a mechanical splice in the conveyor belt to pass through the belt cleaner with no appreciable damage to the splice, the belt, or the blade.

17. A blade unit according to claim 16 wherein the molded resin of the blade comprises polyurethane in a Shore A durometer range of 75 to 85.

* * * * *